(12) United States Patent
Baum

(10) Patent No.: US 7,278,306 B2
(45) Date of Patent: Oct. 9, 2007

(54) WHEEL SENSOR FOR TIRE PRESSURE CONTROL DEVICE WITH HOLDER

(75) Inventor: Michael Baum, Tiefenbronn-Lehningen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/580,175

(22) Filed: Oct. 12, 2006

(65) Prior Publication Data

US 2007/0039382 A1    Feb. 22, 2007

Related U.S. Application Data

(63) Continuation of application No. PCT/EP2005/006022, filed on Jun. 4, 2005.

(30) Foreign Application Priority Data

Aug. 5, 2004    (DE)    ............... 10 2004 037 956

(51) Int. Cl.
    G01M 17/02    (2006.01)
(52) U.S. Cl. ............................................. 73/146
(58) Field of Classification Search ....... 73/146–146.8; 340/444–447
    See application file for complete search history.

(56) References Cited

U.S. PATENT DOCUMENTS 6,357,833 B1    3/2002    Bajer
6,549,125 B2 *    4/2003    Nigon et al. ............... 340/447
6,672,150 B2 *    1/2004    Delaporte et al. ......... 73/146.2
6,694,807 B2 *    2/2004    Chuang et al. ............ 73/146.5
6,805,000 B1 *   10/2004    Sheikh-Bahaie .......... 73/146.8
6,829,925 B2 *   12/2004    Nespo et al. .............. 73/146

FOREIGN PATENT DOCUMENTS

EP    1 386 759 A1    2/2004

* cited by examiner

Primary Examiner—Andre J. Allen
Assistant Examiner—Jermaine Jenkins
(74) Attorney, Agent, or Firm—Laurence A. Greenberg; Werner H. Stemer; Ralph E. Locher

(57) ABSTRACT

A wheel sensor for a tire pressure control device has a holder. To create a wheel sensor for a tire pressure control device which is advantageous to manufacture and assembly and yet does not require any special valve equipment on the wheel, a pivotably mounted housing part be provided on a housing of the wheel sensor, with the housing part being pivotable via a lockable tension element. One rib is provided at the end of the pivotably mounted housing part and another is provided opposite that on the housing. To accommodate the two ribs, corresponding grooves are provided in a holding device on a wheel rim as part of the wheel.

4 Claims, 3 Drawing Sheets

WHEEL SENSOR FOR TIRE PRESSURE CONTROL DEVICE WITH HOLDER

CROSS-REFERENCE TO RELATED APPLICATIONS

This is a continuing application, under 35 U.S.C. § 120, of copending international application No. PCT/EP2005/006022, filed Jun. 4, 2005, which designated the United States; this application also claims the priority, under 35 U.S.C. § 119, of German patent application No. DE 10 2004 037 956.4, filed Aug. 5, 2004; the prior applications are herewith incorporated by reference in their entirety.

BACKGROUND OF THE INVENTION

Field of the Invention

The invention relates to a wheel sensor for a tire pressure control device with a holder.

For example, it is known that a wheel sensor for a tire pressure control device may be configured so that it is permanently connected to a valve body housing of a wheel. The tire pressure sensor is mounted on the wheel together with the valve, so no separate holder is necessary. One disadvantage here is that a standard valve housing made of rubber cannot be used but instead a separate valve housing made completely of metal must be used for strength reasons. Furthermore, it is sometimes impossible to replace the valve housing by itself when there is damage because it is inseparably connected to the wheel electronics. Finally, the wheel electronics cannot be positioned freely but instead must always be situated near the valve for reasons pertaining to the system.

SUMMARY OF THE INVENTION

It is accordingly an object of the invention to provide a wheel sensor for tire pressure control device with a holder which overcomes the above-mentioned disadvantages of the prior art devices of this general type, which is favorable in terms of manufacture and assembly and not requiring any special valve equipment on the wheel.

With the foregoing and other objects in view there is provided, in accordance with the invention, a wheel sensor for a tire pressure control device. The wheel sensor contains two housing parts pivotably joined together and include a first housing part and a second housing part. The first housing part has an underside, a bearing axis, and a further rib running transversely and disposed beneath the bearing axis on the underside. Ribs are provided and one of the ribs is disposed on an end of each of the housing parts. The wheel sensor further has a lockable tension element which acts between the housing parts and a holding device with grooves which corresponds to the ribs.

It is proposed according to the invention that a pivotably mounted housing part be provided on a housing of the wheel sensor. The housing part is pivotable via a lockable tension element. A rib is provided at the end of the pivotably mounted housing part and also opposing it on the housing. To accommodate the two ribs, corresponding grooves are provided in a holding device on a wheel rim as part of the wheel. Ribs and grooves may of course also be provided in the opposite arrangement. For installation of the wheel sensor, the tension element is released and the wheel sensor is inserted into the holding device mounted on the wheel rim. By actuating the tension element, preferably a screw, the pivotably mounting housing part is pivoted until the two ribs engage with the grooves. The wheel sensor is now installed and the tension element can be tightened. The wheel sensor according to the invention is mounted on the wheel independently of the wheel valve, so conventional wheel valves may be used and the wheel sensor may be positioned freely on the wheel rim. The holding device on the wheel may be constructed simply and inexpensively. The fastening of the wheel sensor achieved in this way is permanent on the one hand while on the other hand the wheel sensor can be replaced easily in the event of a repair.

It is proposed that the holding device be configured in the wheel rim itself. To do so, elevations are provided in the wheel rim, with grooves being cut into the elevations, e.g., by milling, to receive the ribs of the wheel sensor. These elevations can be produced in casting the wheel rim or they may be welded on afterwards. For example, if there is enough material on a wheel rim wall, a holding device may also be created here directly in the form of a recess.

Alternatively, the holding device may be manufactured separately and mounted on the wheel rim. Such a holding device can be manufactured very inexpensively by a plastic injection molding method. It is attached permanently by gluing it to the wheel rim. Grooves or other recesses are provided for accommodation and uniform distribution of excess adhesive on the underside of the holding device.

Other features which are considered as characteristic for the invention are set forth in the appended claims.

Although the invention is illustrated and described herein as embodied in a wheel sensor for tire pressure control device with a holder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
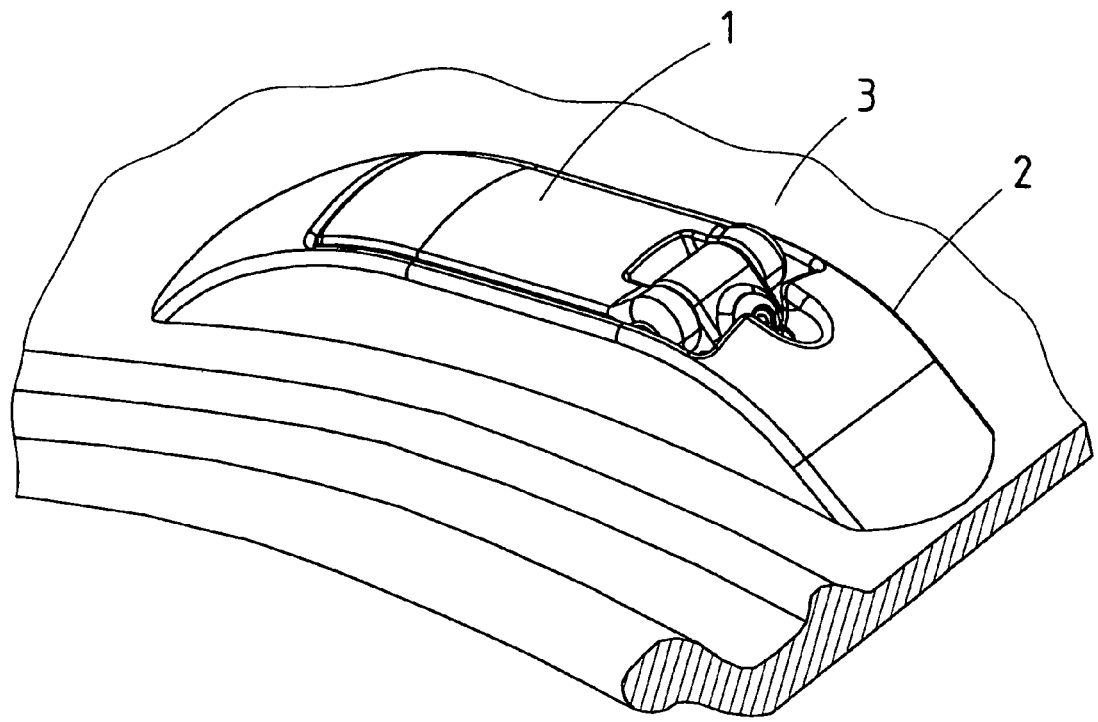
FIG. 1 is a diagrammatic, perspective view of a wheel sensor in a receptacle glued on onto a wheel rim according to the invention.
Figure 2:
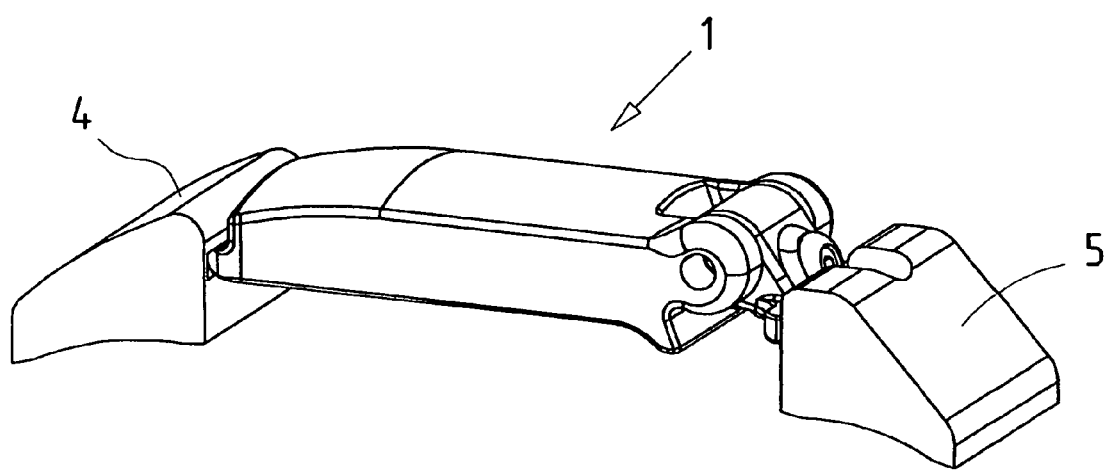
FIG. 2 is a diagrammatic, perspective view of the wheel sensor between elevations on the wheel rim.
Figure 5:
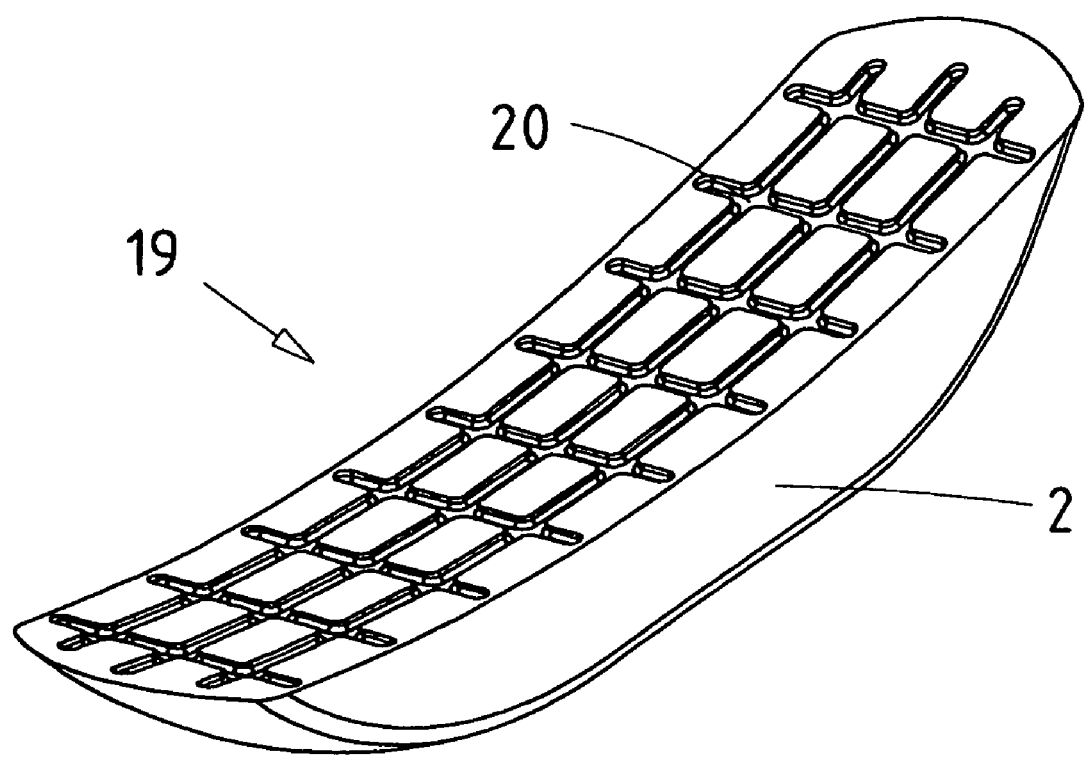
FIG. 5 is a diagrammatic, perspective view of an underside of the receptacle according to FIG. 1.

Referring now to the figures of the drawing in detail and first, particularly, to FIG. 1 thereof, there is shown a wheel sensor 1 depicted in an installed state in a housing 2 which acts as a holding device, whereby the housing 2 is glued to the inside of a wheel rim 3. The wheel rim 3 is part of a non-illustrated wheel. When the housing 2 is glued onto the wheel rim 3, adhesive is applied to an underside 19 of the housing 2 as shown in FIG. 5. A network of grooves 20 which distribute the adhesive uniformly and may optionally hold excess adhesive is worked into an underside 19. FIG. 2 shows the same wheel sensor 1 in the installed state, with two elevations 4, 5 being provided here on the rim 3 as an alternative holding device with the wheel sensor 1 held between them.

Figure 3:
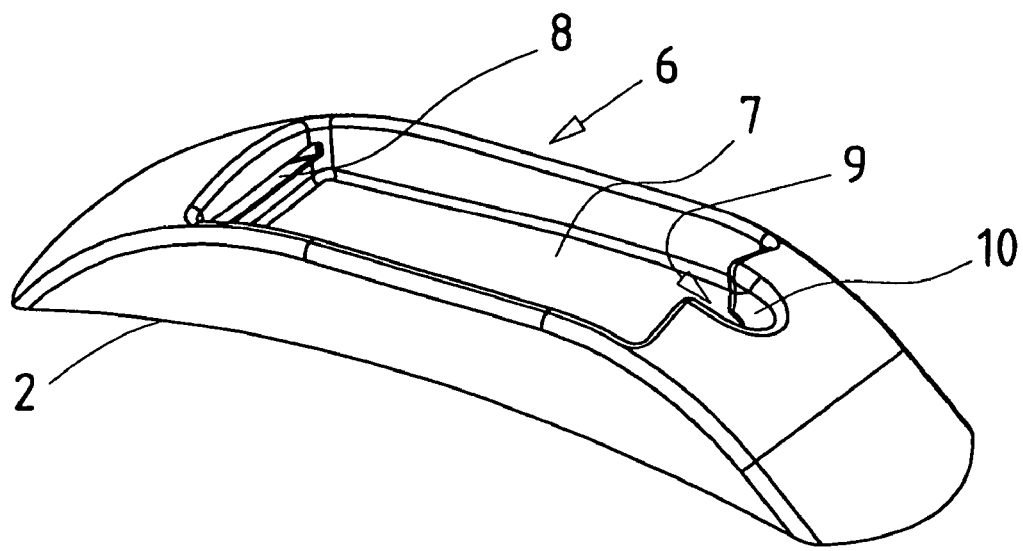
FIG. 3 is a diagrammatic, perspective view of the receptacle according to FIG. 1 without the wheel sensor.

FIG. 3 shows the housing 2 in the uninstalled state. The configuration of a receptacle 6 for the wheel sensor 1 is the same in both alternatives of the holding device, the housing 2 (FIG. 1) and the elevations 4, 5 (FIG. 2). The receptacle 6 has a recess 7 which is so large that it can completely accommodate the wheel sensor 1. Two end walls of the recess 7 are provided with grooves 8, 9. In addition, a recess 10 is also provided on one of the sidewalls to allow the insertion of a tool.

Figure 4:
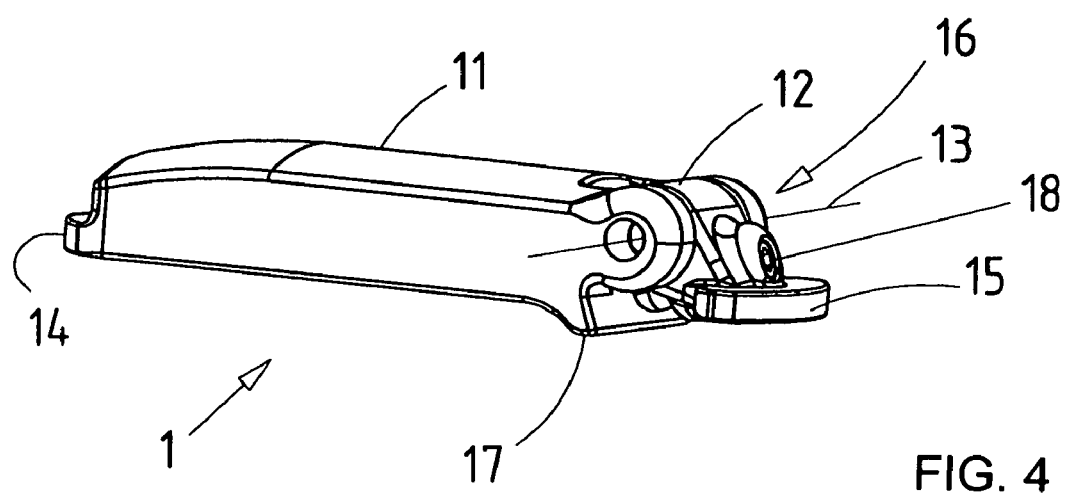
FIG. 4 is a diagrammatic, perspective view of the wheel sensor outside of a receptacle according to FIG. 1.

The wheel sensor 1 shown outside of the receptacle 6 in FIG. 4 includes a first housing part 11 and a second housing part 12, where the second housing part 12 is pivotably mounted on the first housing part 11 via a pivot axis 13. On the first housing part 11 a rib 14 is provided on one end opposite the pivot axis 13. The second housing part 12 has another rib 15 on one end opposite the pivot axis 13. Furthermore, a threaded bore 16 to receive a set screw 18 is provided in the second housing part 12.

On the underside of the first housing part 11, a transverse rib 17 is disposed beneath the bearing axis 13. The rib 17 functions first as a contact face for the set screw 18 and second to support the first housing part 11 on the bottom of the recess 7.

The two housing parts 11, 12 of the wheel sensor can be pivoted toward one another via the set screw 18. If the set screw 18 is unscrewed from the threaded bore 16, the second housing part 12 can be pivoted downward. In this position the wheel sensor 1 may be inserted into the recess 7 and the rib 14 is brought into engagement with the groove 8. By turning the set screw 18 in the threaded bore 16, the second housing part 12 is pivoted until the rib 15 is in engagement with the groove 9. By further turning of the set screw 18 and by further pivoting of the second housing part 12, the wheel sensor 1 is pressed farther and farther down in the recess until the rib 17 is at the bottom of the recess 7.

In this state the wheel sensor 1 is held securely in the housing 2. Since it is under tension in the recess 7, it cannot move. In the event of repair, however, it is easy to replace the wheel sensor 1 by loosening the set screw 18. The set screw 18 is configured so that it can be locked and thus is secured against loosening on its own. To do so, the set screw 18 may be configured as a self-locking screw, for example.

In the alternative holding device, the fastening between the two elevations 4, 5 is accomplished in the same way. The elevations 4, 5 may be integrally cast on the wheel rim 3 or welded there. They are also provided with grooves 8, 9 on the inside.

I claim:

1. A wheel sensor for a tire pressure control device, the wheel sensor comprising:
   two housing parts pivotably joined together and including a first housing part and a second housing part, said first housing part having an underside, a bearing axis, and a further rib running transversely and disposed beneath said bearing axis on said underside;
   ribs, one of said ribs disposed on an end of each of said housing parts;
   a lockable tension element acting between said housing parts; and
   a holding device with grooves formed therein corresponding to said ribs.

2. The wheel sensor according to claim 1, wherein said holding device includes elevations which are molded in a wheel rim.

3. The wheel sensor according to claim 1, said holding device includes a separate receptacle, said receptacle is an injection molded plastic part and is attached to a wheel rim with an adhesive.

4. The wheel sensor according to claim 1, wherein said lockable tension element is a screw.

* * * * *